(12) United States Patent
Sanchez (10) Patent No.: US 11,769,426 B2
(45) Date of Patent: Sep. 26, 2023

(54) SYSTEMS AND METHODS FOR CREATING DRIVING CHALLENGES

(71) Applicant: BlueOwl, LLC, San Francisco, CA (US)

(72) Inventor: Kenneth J. Sanchez, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 693 days.

(21) Appl. No.: 16/793,634

(22) Filed: Feb. 18, 2020

(65) Prior Publication Data

US 2023/0051243 A1    Feb. 16, 2023

(51) Int. Cl.
*G06Q 30/00*    (2023.01)
*G09B 19/16*    (2006.01)
(Continued)

(52) U.S. Cl.
CPC ............. *G09B 19/167* (2013.01); *G06N 7/01* (2023.01); *G06Q 10/06398* (2013.01);
(Continued)

(58) Field of Classification Search
None
See application file for complete search history.

(56) References Cited

U.S. PATENT DOCUMENTS 6,322,366 B1    11/2001    Bergan et al.
7,376,474 B2    5/2008    Graepel et al.
(Continued)

FOREIGN PATENT DOCUMENTS

AU    2017100444 A4 *    5/2017    ............ B60W 40/09
CN    106897774 A    6/2017
(Continued)

OTHER PUBLICATIONS

Hong, Zihan, Ying Chen, and Yang Wu. "A driver behavior assessment and recommendation system for connected vehicles to produce safer driving environments through a "follow the leader" approach." Accident Analysis & Prevention 139 (2020): 105460. (Year: 2020).*

(Continued)

*Primary Examiner* — Michael Bekerman
(74) *Attorney, Agent, or Firm* — Faegre Drinker Biddle & Reath LLP (57) ABSTRACT

Provided herein is a computer system for creating driving challenges for drivers. The computer system may include a processor in communication with a memory device, and the processor may be programmed to: (i) receive driving data associated with a driver, (ii) generate a first model that models the driving data associated with the driver, (iii) calculate a predicted driving score for the driver based at least in part upon the first model, (iv) generate a second model that predicts a confidence of the predicted driving score, (v) calculate a confidence value of the predicted driving score, wherein the confidence value is a squared error of the predicted driving score, and (vi) generate at least one driving challenge for the driver based at least in part upon the predicted driving score and the confidence value for that predicted driving score.

17 Claims, 7 Drawing Sheets

(51) Int. Cl.
  *G06Q 10/0639* (2023.01)
  *G06Q 30/0207* (2023.01)
  *G06N 7/01* (2023.01)
  *G07C 5/02* (2006.01)

(52) U.S. Cl.
  CPC ..... *G06Q 30/0209* (2013.01); *G06Q 30/0224* (2013.01); *G07C 5/02* (2013.01)

(56) References Cited

U.S. PATENT DOCUMENTS

| | | | | |
|---|---|---|---|---|
| 7,565,230 | B2* | 7/2009 | Gardner | G07C 5/085 |
| | | | | 701/32.7 |
| 9,396,444 | B2 | 7/2016 | Bates | |
| 9,892,573 | B1* | 2/2018 | Hsu-Hoffman | G07C 5/008 |
| 10,392,022 | B1* | 8/2019 | Rau | B60W 40/09 |
| 10,445,758 | B1* | 10/2019 | Bryer | G06Q 40/08 |
| 10,878,328 | B2* | 12/2020 | Mathur | G01C 21/3484 |
| 10,990,837 | B1* | 4/2021 | Simoncini | B60W 50/12 |
| 11,199,142 | B2* | 12/2021 | Koi | G06Q 10/06 |
| 2006/0281509 | A1 | 12/2006 | Arias-Vargas et al. | |
| 2010/0238009 | A1* | 9/2010 | Cook | G07C 5/00 |
| | | | | 340/439 |
| 2012/0072241 | A1* | 3/2012 | Krause | G06Q 40/02 |
| | | | | 705/4 |
| 2013/0046510 | A1* | 2/2013 | Bowne | G06Q 10/0639 |
| | | | | 702/187 |
| 2013/0166326 | A1* | 6/2013 | Lavie | G06Q 10/10 |
| | | | | 705/4 |
| 2014/0108198 | A1* | 4/2014 | Jariyasunant | G06Q 40/08 |
| | | | | 705/26.35 |
| 2014/0226010 | A1* | 8/2014 | Molin | G06Q 10/06 |
| | | | | 340/576 |
| 2014/0278574 | A1* | 9/2014 | Barber | B60W 40/09 |
| | | | | 705/4 |
| 2014/0322676 | A1* | 10/2014 | Raman | G09B 19/167 |
| | | | | 434/65 |
| 2015/0081404 | A1* | 3/2015 | Basir | G06Q 30/08 |
| | | | | 705/14.1 |
| 2016/0171521 | A1* | 6/2016 | Ramirez | B60K 35/00 |
| | | | | 701/409 |
| 2018/0053102 | A1* | 2/2018 | Martinson | G08G 1/09623 |
| 2019/0375416 | A1* | 12/2019 | Rau | G06N 20/20 |
| 2020/0164891 | A1* | 5/2020 | Bender | B60W 50/0098 |
| 2021/0118330 | A1* | 4/2021 | Baer | G08G 1/0967 |
| 2021/0125076 | A1* | 4/2021 | Zhang | G06N 3/0454 |

FOREIGN PATENT DOCUMENTS

| | | | | |
|---|---|---|---|---|
| CN | 107377634 A | | 11/2017 | |
| CN | 107749008 A | * | 3/2018 | |
| WO | WO-2015053423 A1 | * | 4/2015 | ............ B60W 40/08 |

OTHER PUBLICATIONS

Joubert, Johan W., Dirk De Beer, and Nico De Koker. "Combining accelerometer data and contextual variables to evaluate the risk of driver behaviour." Transportation research part F: traffic psychology and behaviour 41 (2016): 80-96. (Year: 2016).*

* cited by examiner

SYSTEMS AND METHODS FOR CREATING DRIVING CHALLENGES

FIELD OF DISCLOSURE

The present disclosure relates to creating driving challenges and, more particularly, to a network-based system and method for generating one or more driving score goals based at least in part upon a probability that a driver will achieve a driving score goal and rewarding the driver for achieving said driving score goal or goals.

BACKGROUND

Consumers have become increasingly interested in participating in challenges in order to improve behaviors, particularly challenges that generate rewards. Challenges allow consumers to strive toward challenge goals and compete with other consumers and/or the consumers themselves.

In known challenge platforms, goals may be static goals for all challenge participants and therefore may be unfair to many challenge participants. That is, the goals may not be determined on an individual basis. For example, challenge participants may strive towards a goal score shared by all challenge participants instead of striving towards a goal score based at least in part upon the specific performance of each challenge participant and the probability of each challenge participant reaching the goal. Further, current challenge platforms do not include driving-specific challenges or goals. Therefore, challenge platforms with goals based at least in part upon achievement probability and improving driving behavior are needed.

BRIEF SUMMARY

The present embodiments may relate to systems and methods for creating driving challenges. The system may include a driving challenge server that carries out the methods.

In one aspect, a computer system for creating driving challenges for drivers may be provided. The computer system may include at least one processor in communication with at least one memory device, and the at least one processor may be programmed to: (i) receive driving data associated with a driver, (ii) generate a first model that models the driving data associated with the driver, (iii) calculate a predicted driving score for the driver based at least in part upon the first model, (iv) generate a second model that predicts a confidence of the predicted driving score, (v) calculate a confidence value of the predicted driving score, wherein the confidence value is a squared error of the predicted driving score, and (vi) generate at least one driving challenge for the driver based at least in part upon the predicted driving score and the confidence value for that predicted driving score.

In another aspect, a computer-based method for creating driving challenges for drivers may be provided. The method may be implemented on a computer device that includes at least one processor in communication with at least one memory device, and the method may include: (i) receiving driving data associated with a driver, (ii) generating a first model that models the driving data associated with the driver, (iii) calculating a predicted driving score for the driver based at least in part upon the first model, (iv) generating a second model that predicts a confidence of the predicted driving score, (v) calculating a confidence value of the predicted driving score, wherein the confidence value is a squared error of the predicted driving score, and (vi) generating at least one driving challenge for the driver based at least in part upon the predicted driving score and the confidence value for that predicted driving score.

In yet another aspect, at least one non-transitory computer-readable storage media having computer-executable instructions embodied thereon may be provided. When executed by at least one processor in communication with at least one memory device, the computer-executable instructions may cause the processor to: (i) receive driving data associated with a driver, (ii) generate a first model that models the driving data associated with the driver, (iii) calculate a predicted driving score for the driver based at least in part upon the first model, (iv) generate a second model that predicts a confidence of the predicted driving score, (v) calculate a confidence value of the predicted driving score, wherein the confidence value is a squared error of the predicted driving score, and (vi) generate at least one driving challenge for the driver based at least in part upon the predicted driving score and the confidence value for that predicted driving score.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

Depending upon embodiment, one or more benefits may be achieved. These benefits and various additional objects, features and advantages of the present invention can be fully appreciated with reference to the detailed description and accompanying drawings that follow.

The Figures depict preferred embodiments for purposes of illustration only. One skilled in the art will readily recognize from the following discussion that alternative embodiments of the systems and methods illustrated herein may be employed without departing from the principles of the disclosure.

DETAILED DESCRIPTION OF THE DRAWINGS

The present embodiments may relate to, inter alia, systems and methods for creating unique driving challenges for drivers to promote good driving behavior. In one exemplary embodiment, the methods may be performed by a driving challenge server (also referred to herein as a "DC server," "driving challenge computing device," and "driving challenge computer system"). In the exemplary embodiment, the driving challenge server may be associated with a driving challenge application that may be accessed by user devices (e.g., mobile devices associated with the drivers). In some embodiments, the DC server may be associated with an insurance provider, and the DC server may create the driving challenges on behalf of the insurance provider.

In the exemplary embodiment, the driving challenge server may receive driving data from a plurality of users (e.g., drivers) to create driving challenges. The driving data may be data associated with driving behaviors of the users, and may include telematics data (e.g., braking data, acceleration data, and speed data) and demographic data (e.g., user age and location). The driving data may be received from sensors associated with determining the driving behavior of the users (e.g., telematics sensors associated with vehicles of the users, mobile device sensors of the users include gyroscopes, accelerometers, GPS, etc.).

In the exemplary embodiment, the driving challenges may be based at least in part upon a first model and a second model generated by the DC server. The first model may predict (e.g., using machine learning and/or artificial intelligence techniques) a driving score of a user based at least in part upon the driving data of the user, and the second model may predict (e.g., using machine learning and/or artificial intelligence techniques) a confidence value (e.g., a squared error value) for the predicted driving score of the first model. A mean value of the predicted driving score from the first model, and a squared error variance of the confidence value of the predicted driving score may be calculated. Based at least in part upon the mean value of the predicted driving score and the squared error variance of the confidence value, a data distribution may be generated to determine a probability that the user will achieve the predicted driving score.

The predicted driving score and corresponding probability that the user will achieve the driving score may be used by the DC server to generate one or more driving score goals for the user. The driving score goals may include an "easy" driving score goal (e.g., a higher likelihood of the goal being achieved), an "intermediate" driving score goal (e.g., an intermediate likelihood of the goal being achieved), and a "hard" driving score goal (e.g., a lesser likelihood of the goal being achieved), and the difficulty of the driving score goals may be based at least in part upon (e.g., inversely proportional to) the probability that the driver achieves the driving score goals. For example, the easy driving score goal may be based at least in part upon a high probability that the driver achieves the easy driving score goal, and the low driving score goal may be based at least in part upon a low probability that the driver achieves the low driving score goal. A low driving score goal may also be referred to as a hard driving score goal. The driving score goals may be generated by the DC server based at least in part upon the driving data associated with each of a plurality of users and therefore may be unique for each of the plurality of users.

An actual driving score of the user may be received by the DC server, and the actual driving score may be based at least in part upon driving data of the user over a certain period of time (e.g., monthly, bi-monthly, semi-annually, annually, etc.). The DC server may determine whether the actual driving score of the user satisfies any of the driving score goals for the user. If the actual driving score satisfies a driving score goal (e.g., the driver scores higher or better than a score goal), the DC server may determine a reward for the user/driver that is representative of and/or inversely proportional to the probability that the user would achieve the driving score goal. For example, if the actual driving score satisfies the low driving score goal, the determined reward for the user may be of high or higher value than that of the easy goal because the probability that the user would satisfy the low driving score goal is low. The systems and methods of this exemplary embodiment are described below in greater detail.

Examples of Driving Data

In the exemplary embodiment, one or more users may enroll and/or opt-in to a driving challenge (DC) service provided by the DC server, and in response, the DC server may receive driving data associated with the users. Driving data may include (i) user data that may include driving history data (e.g., claims filed by the users, accident history, citation history, etc.), demographics data (e.g., age, sex, income, etc.), and location data (e.g., home address), (ii) telematics data (e.g., any data associated with operation of a vehicle, such as acceleration, braking, cornering, vehicle mileage) that may include vehicle sensor data, and (iii) driving score data that may be based at least in part upon the telematics data. The user data may be input by the user into the DC server (e.g., through a user interface) when the user enrolls in the DC service associated with the DC server. The telematics data may be collected by one or more sensors mounted on or installed within a vehicle (e.g., gas pedal sensors, brake pedal sensors, engine sensors, etc.) and/or may be collected by one or more sensors (e.g., accelerometer, gyroscope, GPS, etc.) of a user device (e.g., a mobile device). The telematics data may be received any time the user operates a vehicle.

The telematics data may monitor driving behaviors of the user based at least in part upon how the user operates the vehicle. For example, the telematics data may monitor the vehicle's acceleration, hard braking, and cornering. Rapid and inconsistent acceleration, frequent hard braking, and rapid or sharp cornering may be related to an increased accident risk for drivers and may be considered bad driving behaviors of users. The DC server may generate a current driving score of the user based at least in part upon the telematics data and driving behaviors of the user. High driving scores may be associated with good driving behaviors of the user, and low driving scores may be associated with bad driving behaviors of the user. For example, if the telematics data of the user shows that the user has consistent acceleration, infrequent hard braking, and slow and smooth cornering, the DC server may generate a high driving score for the user. The DC server may store (e.g., in a database associated with the DC server) the driving data for each user.

Examples of Generating Models

The DC server may generate a first model that models the received driving data. The first model may model the driving data for a specific period of time (e.g., driving data from the past month, from the past two months, from the past year, etc.) and/or the first model may model all available driving data. The DC server may predict (e.g., using machine learning and/or artificial intelligence techniques), based at least in part upon the first model, a driving score for the user. The DC server may predict the driving score for a specific period of time (e.g., for the next month, two months, six months, year, etc.). In other words, the first model models driving data (e.g., user data, telematics data, driving score data) for the user for a specific period of time, and the DC server uses the first model to predict the driving score for the user at a future point in time. For example, the DC server may use the first model to predict a driving score related to braking, acceleration, and/or cornering of the user, and may predict that driving score for the next month.

The DC server may generate a second model to predict an error of the first model. The second model may predict, for example, how far the first model is off in predicting the driving score or how much error there is in the first model. Specifically, the second model may predict a confidence value for the first model, and the confidence value may indicate how confident the second model is that the prediction of the first model is accurate. The confidence value may be a squared error of the predicted driving score of the first model. Further, the second model may be able to show patterns in error for the first model. For example, if the first model is generated for a 16 year old user who just got their license and does not have much driving data, the second model may predict more error in the first model due to the lack of data or limited driving experience of the driver as compared to a 45 year old driver with three children and a long driving history. If the first model is generated for the 45 year old driver who has a lot of driving data, the second model may predict that there is very little error or variation in the first model.

The first model and second model may be trained using a variety of different machine learning/prediction techniques. For example, the first model and second model may be trained using "out of fold" prediction techniques. Out of fold predictions may be generated by taking a data set (e.g., the driving data), shuffling the data set, dividing the data set into different groups and training the model based at least in part upon a subset of the different groups. For example, the driving data for a user may be shuffled, divided into ten groups, and groups one through nine may be used to train the model a first time, then groups two through ten may be used to train the model a second time, and so on until the model is trained ten times using the ten different data groups.

The DC server may calculate a mean of the first model (e.g., a mean predicted driving score) and a squared error variance of the second model (e.g., a squared error variance of the confidence value that predicts the variance of the error). The DC server may then use the calculated mean and squared error variance in a data distribution. For example, the DC server may input the mean and variance of the models into a beta distribution or any other distribution related to the mean and variance. The data distribution may describe a probability (e.g., on a scale of 0 to 1) of achieving different values associated with the models. The data distribution may calculate a probability that a driver will achieve a higher driving score than predicted driving scores of the first model. For example, if the driving scores are on a scale of 0 to 100, the data distribution may indicate that there is a 95% probability of a driver having an actual driving score of 10 or above, that there is a 75% probability of the driver having an actual driving score of 50 or above, that there is a 50% probability of the driver having an actual driving score of 60, and/or a 10% probability of the driver having an actual driving score of 80. Further, the data distribution may predict a probability that the driver will have an actual driving score of more or less than the driving score of the previous month, previous two months, etc.

Examples of Generating One or More Driving Score Goals and Challenges

The DC server may generate individual driving score goals (also referred to herein as driving challenges) for the user based at least in part upon the probability that the user will achieve the driving score goals. In the exemplary embodiment, the DC server may generate an easy driving score goal, an intermediate driving score goal, and a low driving score goal. The easy driving score goal (e.g., an actual driving score of 50) may correspond with a high probability (e.g., greater than 75%) that the user will achieve the easy driving score goal, the intermediate driving score goal (e.g., an actual driving score of 70) may correspond with an intermediate probability (e.g., greater than 25% but less than 75%) that the user will achieve the medium driving score goal, and the low driving score goal (e.g., an actual driving score of 85) may correspond with a low probability (e.g., less than 25%) that the user will achieve the low driving score goal. In other embodiments, the DC server may generate additional or fewer driving score goals for the user, and the probabilities that correspond with the generated driving score goals may be any probability selected by the DC server or, for example, an insurance provider associated with the DC server.

Basing the driving score goals upon the probability that the user will achieve the driving score goal and on actual driving data for the driver, rather than, for example, setting arbitrary driving score goals for all users, ensures that the driving score goals are fair and equitable for all users. In other words, the difficulty of achieving the driving score goals is the same for all users because the driving score goals are based at least in part upon probability instead of arbitrary driving score goals. For example, if a first user has a driving score of 89 and a second user has a driving score of 60 and a driving score goal for the users is an arbitrary driving score goal (e.g., raising the driving score by 2 points or raising the driving score by 10%), the driving score goal would be much harder for the first user to achieve than the second user to achieve because the driving score of the first user is already very high. Accordingly, basing the driving score goals upon the probability that the users will achieve driving score goals specific to each user ensures that the driving score goals are fair between users. For example, the driving score goals of the first user may include an easy driving score goal (e.g., corresponding to an 80% chance of achieving the driving score goal) of 86, a medium driving score goal (e.g., corresponding to between a 80% chance and a 30% chance of achieving the driving score goal) of 89, and a low driving score goal (e.g., corresponding to a 30% chance of achieving the driving score goal) of 92. The driving score goals of the second user may include an easy driving score goal of 62, a medium driving score goal of 70, and a low driving score goal of 77 that correspond to the same probabilities (e.g., levels of difficultly) that the driving score goals of the first user correspond to. The DC server generates the driving score goals individually for each user such that the driving score goals are fair (e.g., have the same level of difficulty) amongst the users. The DC server may store the driving score goals associated with each user in a database associated with the DC server.

The DC server may update the models and the data distribution periodically based at least in part upon receiving new driving data (e.g. actual driving scores or driving history data including accidents or tickets) and therefore may update the driving score goals periodically as well. For example, the DC server may create new driving score goals for the user each month, every two months, bi-annually, etc. Through creating new driving score goals periodically, the DC server may promote good driving behaviors in users through the driving score goals/challenges and encouraging the users to increase their actual driving scores and meet the driving score goals.

Examples of Providing Rewards

After a period of time (e.g., a month, two months, six months, etc.) that the driving score goals were generated for passes, the DC server may generate an actual driving score for the user based at least in part upon driving data (e.g., telematics data) over the period of time. The DC server may compare the actual driving score of the user to the driving score goals of the user (e.g., retrieved from the database) and determine whether the user achieved one driving score goal of the one or more driving score goals. The DC server may also determine the probability that corresponds to the actual driving score for the user. For example, if the actual driving score of the user having an easy driving score goal (e.g., corresponding to an 80% chance of achieving the driving score goal) of 86, a medium driving score goal (e.g., corresponding to between a 80% chance and a 30% chance of achieving the driving score goal) of 89, and a low driving score goal (e.g., corresponding to a 30% chance of achieving the driving score goal) of 92 is 90, the DC server may determine that the user met the medium driving score goal. Further, the DC server may determine that the probability of the user achieving the actual driving score of 90 is 40%. In other embodiments, the DC server may just determine which, if any, driving score goals the user achieved.

The DC server and/or the insurance provider associated with the DC server may provide a reward based at least in part upon the driving score goal that the user achieved with the actual driving score. The reward may be proportional to and/or representative of the difficulty (e.g., based at least in part upon the corresponding probability) of achieving the driving score goal. For example, the DC server may provide a small reward if the actual driving score goal of the user achieves the easy driving score goal, a medium reward if the actual driving score goal of the user achieves the medium driving score goal, and a high reward if the actual driving score goal of the user achieves the high driving score goal. For example, the DC server may provide a $5 reward to the user if the user achieves the easy driving score goal, a $10 reward to the user if the user achieves the medium driving score goal, and a $20 reward to the user if the user achieves the high driving score goal. Additionally or alternatively, the DC server may base the reward upon the probability that the user achieved the actual driving score. For example, the reward may fluctuate between $5 and $20 based at least in part upon the exact probability that the driver would achieve the actual driving score (e.g., rather than ranges of probabilities corresponding to the different difficulties of driving score goals).

The DC server may provide the reward to the user in any suitable way. For example, the reward may be a prepaid card with the reward amount loaded onto the prepaid card, a digital wallet credit, a check, an insurance credit (e.g., for an insurance premium of the user provided by the insurance provider), an insurance premium discount (e.g., for the insurance premium of the insurance policy of the user provided by the insurance provider), and/or any other suitable reward for the user including merchant discounts or specific items.

Accordingly, the DC server not only generates fair driving score goals for each user, the DC server also provides proportional rewards based at least in part upon the difficulty and probability of the users achieving the generated driving score goals. Through challenging the users to drive with better driving habits through driving score goals and providing rewards proportional to and/or representative of how hard and/or likely it is that the user achieves the driving score goals, the DC server promotes better and safer driving behaviors and habits of users while ensuring that each user has fair and equitable goals and rewards.

At least one technical problem addressed by this system may include: (i) inability to create fair driving challenges for each driver of a plurality of drivers; (ii) inability to provide proportional rewards to drivers based at least in part upon driving challenges; and (iii) inability to use different models to create driving challenges and predict future driving scores.

The methods and systems described herein may be implemented using computer programming or engineering techniques including computer software, firmware, hardware, or any combination thereof, where the technical effect may be achieved by performing at least one of the following steps: (i) receiving driving data associated with a driver, (ii) generating a first model that models the driving data associated with the driver, (iii) calculating a predicted driving score for the driver based at least in part upon the first model, (iv) generating a second model that predicts a confidence of the predicted driving score, (v) calculating a confidence value of the predicted driving score, wherein the confidence value is a squared error of the predicted driving score, and (vi) generating at least one driving challenge for the driver based at least in part upon the predicted driving score and the confidence value for that predicted driving score.

At least one technical solution provided by this system may include: (i) improving prediction accuracy using a second model to calculate the confidence values of the first model predictions; (ii) improving probability predictions using a first model to calculate predictions to generate a prediction mean and using a second model to calculate the confidence values of the first model predictions to generate a squared error variance of the confidence values; (iii) providing proportional rewards based at least in part upon the probability of achieving goal scores; and/or (iv) providing equivalent goals to a plurality of users based at least in part upon the probability of a user achieving the goal (e.g., such that each goal is equally difficult to achieve for each user).

Exemplary Processes for Creating Driving Challenges

Figure 1:
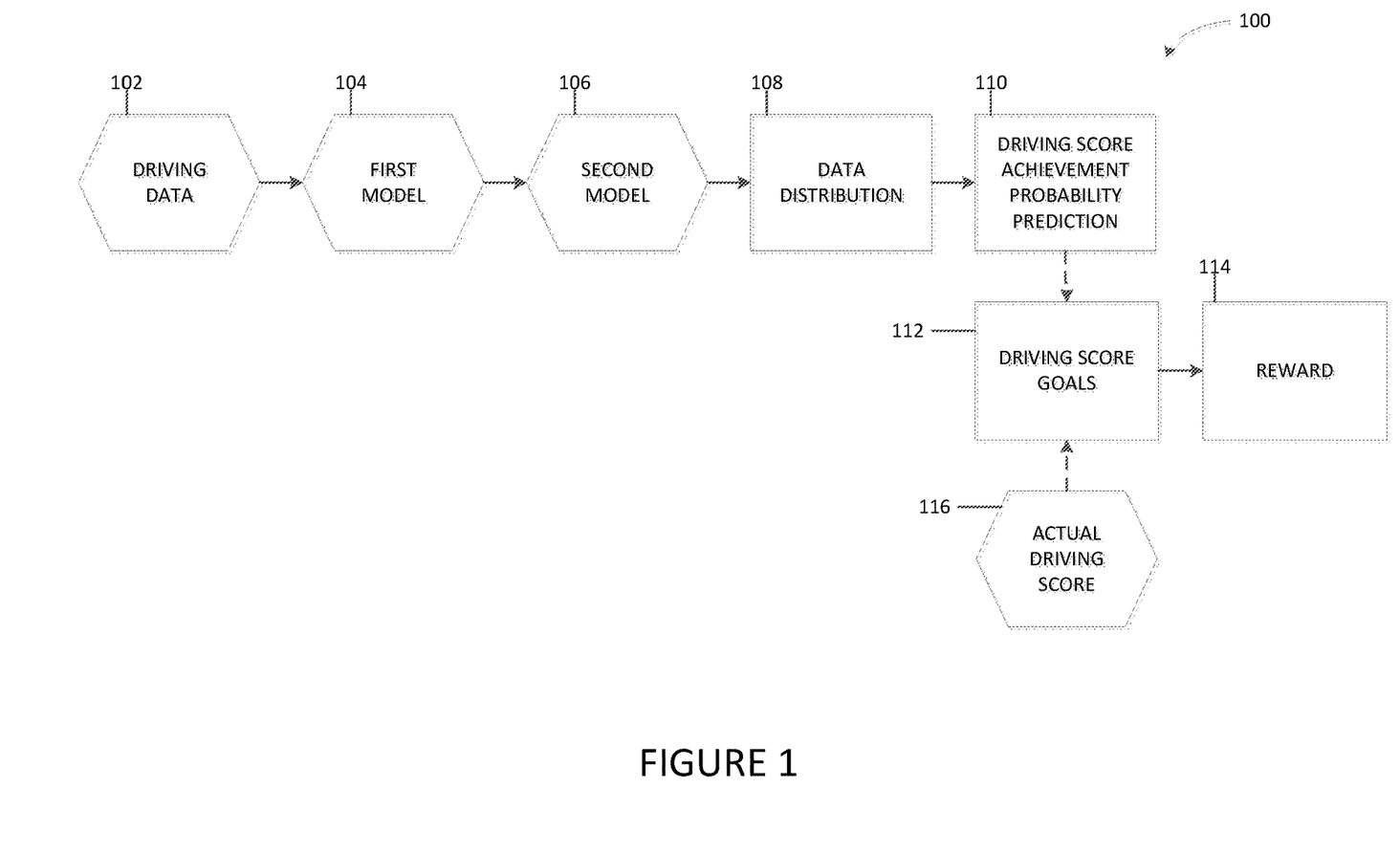
FIG. 1 illustrates a flow chart of an exemplary process of creating driving challenges in accordance with an exemplary embodiment of the present disclosure.

FIG. 1 illustrates a flow chart of an exemplary computer-implemented process 100 for creating driving challenges. Process 100 may be carried out by a computing device and/or server (e.g., driving challenge server 210 shown in FIG. 2). In the exemplary embodiment, one or more users (e.g., drivers) may enroll and/or opt-in to a driving challenge service provided by a driving challenge computer system (e.g., computer system 200 shown in FIG. 2). Upon enrollment/opting-in, driving data 102 may be received by driving challenge server 210. Driving data 102 may include user data, telematics data (e.g., any data associated with operation of a vehicle, such as acceleration, braking, cornering, vehicle mileage), and driving score data based at least in part upon the telematics data.

A first model 104 may be generated that may model driving data 102 for the user. First model 104 may model the driving data for a specific period of time (e.g., driving data from the past month, from the past two months, from the past year, etc.) and/or first model 104 may model all available driving data. Driving challenge server 210 may predict, based at least in part upon first model 104, a driving score for the user (e.g., for a specific period of time). A second model 106 may be generated to predict an error of first model 104 (e.g., how far off first model 104 is in predicting the driving score of the user). Specifically, second model 106 may predict a confidence value (e.g., a squared error) for first model 104. First model 104 and second model 106 may be generated and trained using a variety of different machine learning/prediction techniques.

In the exemplary embodiment, driving challenge server 210 may calculate a mean of first model 104 (e.g., a mean predicted driving score) and a squared error variance of second model 106 (e.g., a squared error variance of the confidence value that predicts the variance of the error). Using the calculated mean and squared error variance, a data distribution 108 may be generated, and data distribution 108 may describe a probability of achieving different values associated with first model 104 and second model 106. That is, data distribution 108 may calculate a driving score achievement probability prediction 110. For example, driving score achievement probability prediction 110 may be a probability that a driver will achieve a higher driving score than predicted driving scores of first model 104.

Driving score achievement probability prediction 110 may be used to create driving score goals 112 (or driving challenges 112) based at least in part upon the probability that the user will achieve driving score goals 112. For example, an easy driving score goal 112, an intermediate driving score goal 112, and a low driving score goal may be generated. Easy driving score goal 112 may correspond with a high probability (e.g., greater than 75%) that the user will achieve easy driving score goal 112, intermediate driving score goal 112 may correspond with an intermediate probability (e.g., greater than 25% but less than 75%) that the user will achieve medium driving score goal 112, and low driving score goal 112 may correspond with a low probability (e.g., less than 25%) that the user will achieve low driving score goal 112. Driving score goals 112 may be set for a certain period of time (e.g., a month, two months, six months, etc.).

In the exemplary embodiment, driving score goals 112 may be associated with rewards 114 if the user satisfies (e.g., meets or exceeds) driving score goals 112. Rewards 114 may be representative of and/or correspond to the probability that the user satisfies driving score goals 112. For example, a high or higher value reward 114 may be determined for high driving score goal 112 compared to reward 114 for easy driving score goal 112 (e.g., because it is more difficult and less probabilistically likely that the user satisfies high driving score goal 112 than easy driving score goal 112).

After the period of time passes that driving score goals 112 are set for, driving challenge server 210 may generate an actual driving score 116 (e.g., based at least in part upon driving data 102 for the period of time). Actual driving score 116 may be compared to driving score goals 112 to determine whether the user satisfied any of driving score goals 112. If the user satisfied a driving score goal 112, determined reward 114 for the satisfied driving score goal 112 may be provided to the user.

Since process 100 generates first and second models 104 and 106 based at least in part upon driving data 102 for each user and creates unique driving score goals 112 based at least in part upon first and second models 104 and 106, process 100 ensures that driving score goals 112 are fair for each user. That is, because driving score goals 112 are based at least in part upon driving score achievement probabilities 110, and not an arbitrary percent or point increase in driving scores, process 100 makes the difficulty of satisfying driving score goals 112 equal between users, no matter what the starting driving scores (of driving data 102) of the users are. Further, process 100 determines rewards 114 proportional to and/or representative of the difficulty of satisfying driving score goals 112.

Exemplary Computer Networks

Figure 2:
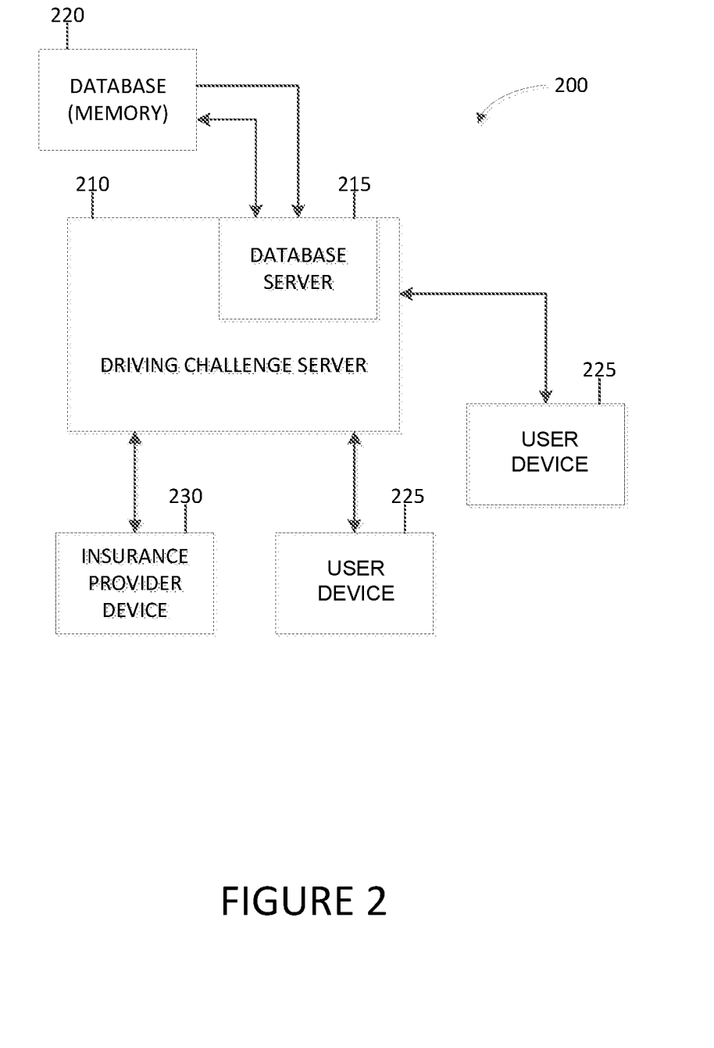
FIG. 2 illustrates a simplified block diagram of an exemplary computer system for implementing the process shown in FIG. 1.

FIG. 2 depicts a simplified block diagram of an exemplary system 200 for implementing process 100 shown in FIG. 1. In the exemplary embodiment, system 200 may be used for creating driving challenges. Driving challenge server 210 may be configured to (i) receive driving data 102, (ii) generate first model 104, (iii) generate second model 106, (iv) generate data distribution 108 based at least in part upon first model 104 and second model 106, (vii) make driving score achievement probability prediction 110 based at least in part upon data distribution 108, and (viii) create driving score goals 112 based at least in part upon prediction 110 (all shown in FIG. 1).

In the exemplary embodiment, user devices 225 may be computers that include a web browser or a software application, which enables user devices 225 to access remote computer devices, such as driving challenge server 210, using the Internet or other network. More specifically, user devices 225 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User devices 225 may be any device capable of accessing the Internet including, but not limited to, a cellular phone, a smartphone, a tablet, a phablet, wearable electronics, smart watch, or other web-based connectable equipment or mobile devices.

A database server 215 may be communicatively coupled to a database 220 that stores data. In one embodiment, database 220 may include driving data 102, models (such as first model 104 and second model 106), data distributions 108, predictions 110, and driving score goals 112. In the exemplary embodiment, database 220 may be stored remotely from driving challenge server 210. In some embodiments, database 220 may be decentralized. In the exemplary embodiment, a user may access database 220 via user device 225 by logging onto driving challenge server 210, as described herein.

An insurance provider device 230 may be communicatively coupled with driving challenge server 210. In some embodiments, insurance provider device 230 may be associated with, or is part of a computer network associated with an insurance provider, or in communication with the insurance provider's computer network (not shown). In other embodiments, insurance provider device 230 may be associated with a third party and is merely in communication with the insurance provider's computer network. That is, insurance provider device 230 may be associated with a user associated with user device 225 (e.g., the user may have one or more insurance policies provided by the insurance provider associated with insurance provider device 230). More specifically, insurance provider device 230 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance provider device 230 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Driving challenge server 210 may be in communication with a plurality of user devices 225, a plurality of insurance provider devices 230, and a plurality of databases 220 to create driving challenges for users associated with user devices 225. Furthermore, in some embodiments, insurance provider device 230 may be configured in a network that allows driving challenge sever 210 to communicate driving challenges to insurance provider device 230. In some embodiments, driving challenge server 210 may be associated with an insurance provider, or in communication with the insurance provider's computer network (not shown). In other embodiments, driving challenge server 210 may be associated with a third party and is merely in communication with the insurance provider's computer network.

Exemplary Client Devices

Figure 3:
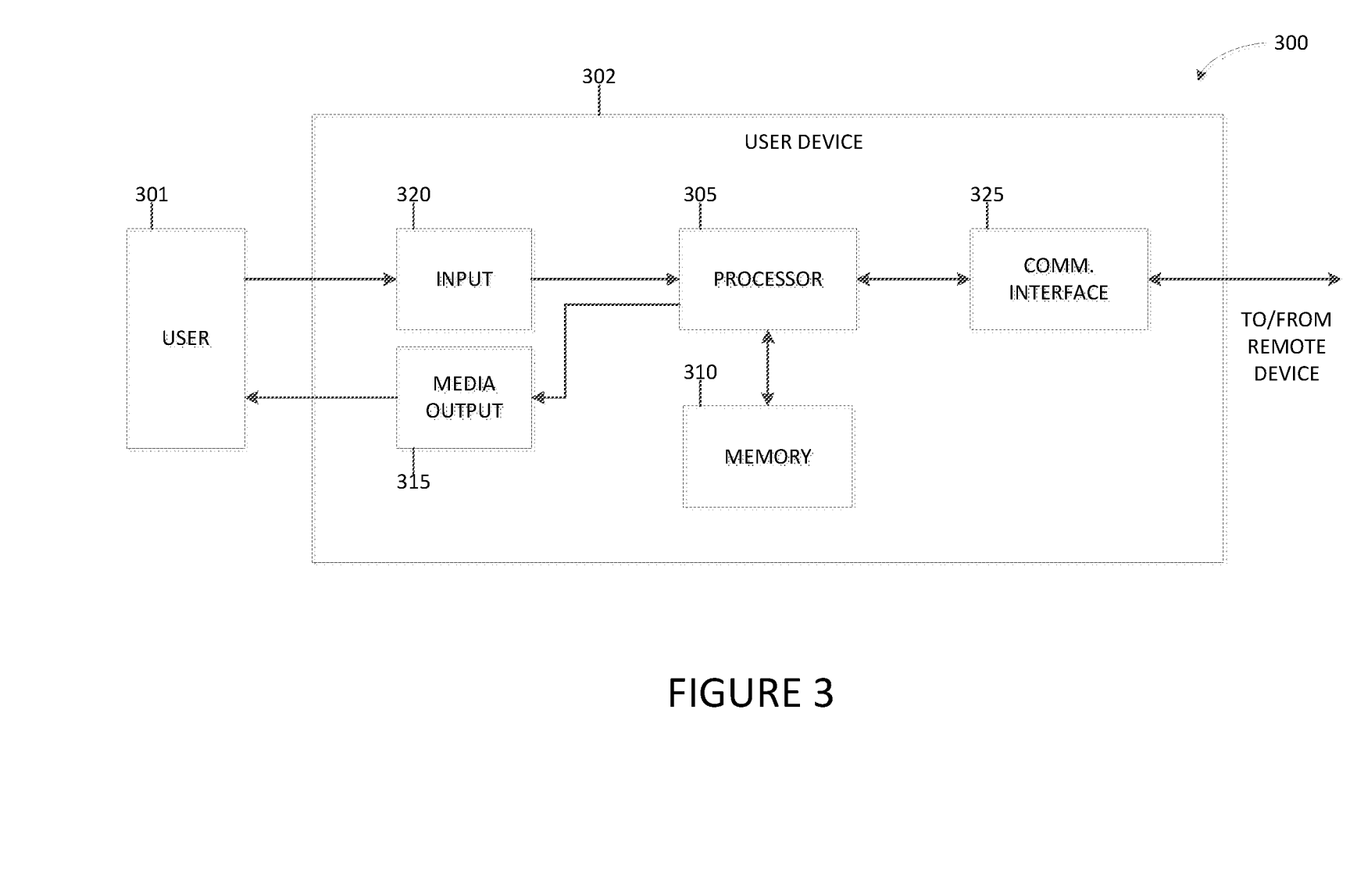
FIG. 3 illustrates an exemplary configuration of a user computer device in accordance with one embodiment of the present disclosure.

FIG. 3 depicts an exemplary configuration of user device in an environment 300, in accordance with one embodiment of the present disclosure. User device 302 may be operated by a user 301. User device 302 may include, but is not limited to, user devices 225 (shown in FIG. 2). User device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer readable media.

User device 302 may also include at least one media output component 315 for presenting information to user 301. Media output component 315 may be any component capable of conveying information to user 301. In some embodiments, media output component 315 may include an output adapter (not shown) such as a video adapter and/or an audio adapter. An output adapter may be operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. In some embodiments, user device 302 may include an input device 320 for receiving input from user 301. User 301 may use input device 320 to, without limitation, view driving score goals 112 and rewards 114 (both shown in FIG. 1).

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User device 302 may also include a communication interface 325, communicatively coupled to a remote device such as driving challenge server 210 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from driving challenge server 210. A client application may allow user 301 to interact with, for example, driving challenge server 210. For example, instructions may be stored by a cloud service, and the output of the execution of the instructions sent to the media output component 315.

Exemplary Server Devices

Figure 4:
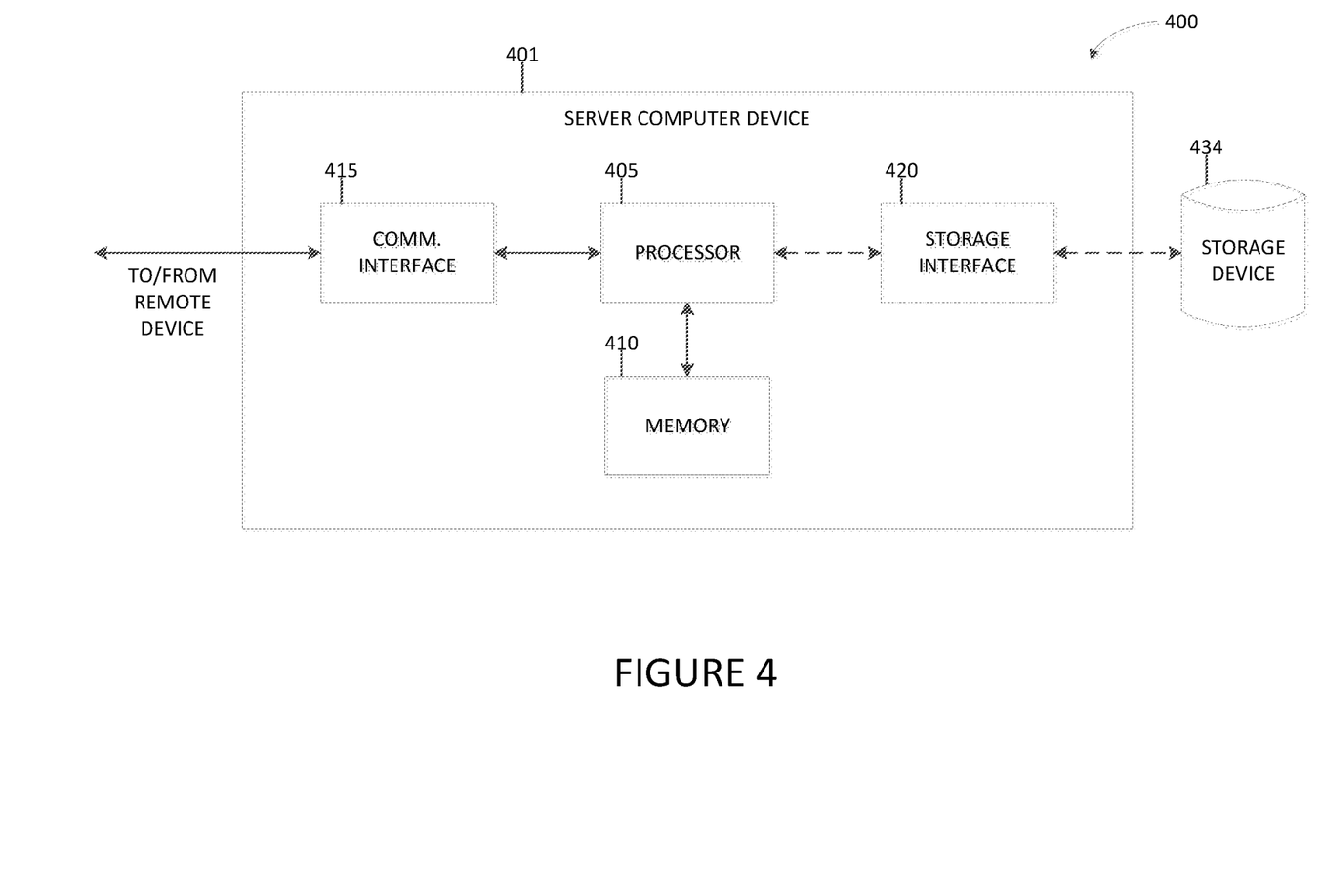
FIG. 4 illustrates an exemplary configuration of a server system in accordance with one embodiment of the present disclosure.

FIG. 4 depicts an exemplary configuration of server system in an environment 400, in accordance with one embodiment of the present disclosure. Server computer device 401 may include, but is not limited to, driving challenge server 210 and database server 215 (both shown in FIG. 2). Server computer device 401 may also include a processor 405 for executing instructions. Instructions may be stored in a memory area 410. Processor 405 may include one or more processing units (e.g., in a multi-core configuration).

Processor 405 may be operatively coupled to a communication interface 415 such that server computer device 401 is capable of communicating with a remote device such as another server computer device 401 and driving challenge server 210. For example, communication interface 415 may receive requests from user devices 225 via the Internet, as illustrated in FIG. 2.

Processor 405 may also be operatively coupled to a storage device 434. Storage device 434 may be any computer-operated hardware suitable for storing and/or retrieving data, such as, but not limited to, data associated with database 220 (shown in FIG. 2). In some embodiments, storage device 434 may be integrated in server computer device 401. For example, server computer device 401 may include one or more hard disk drives as storage device 434.

In other embodiments, storage device 434 may be external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 434 via a storage interface 420. Storage interface 420 may be any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 6:
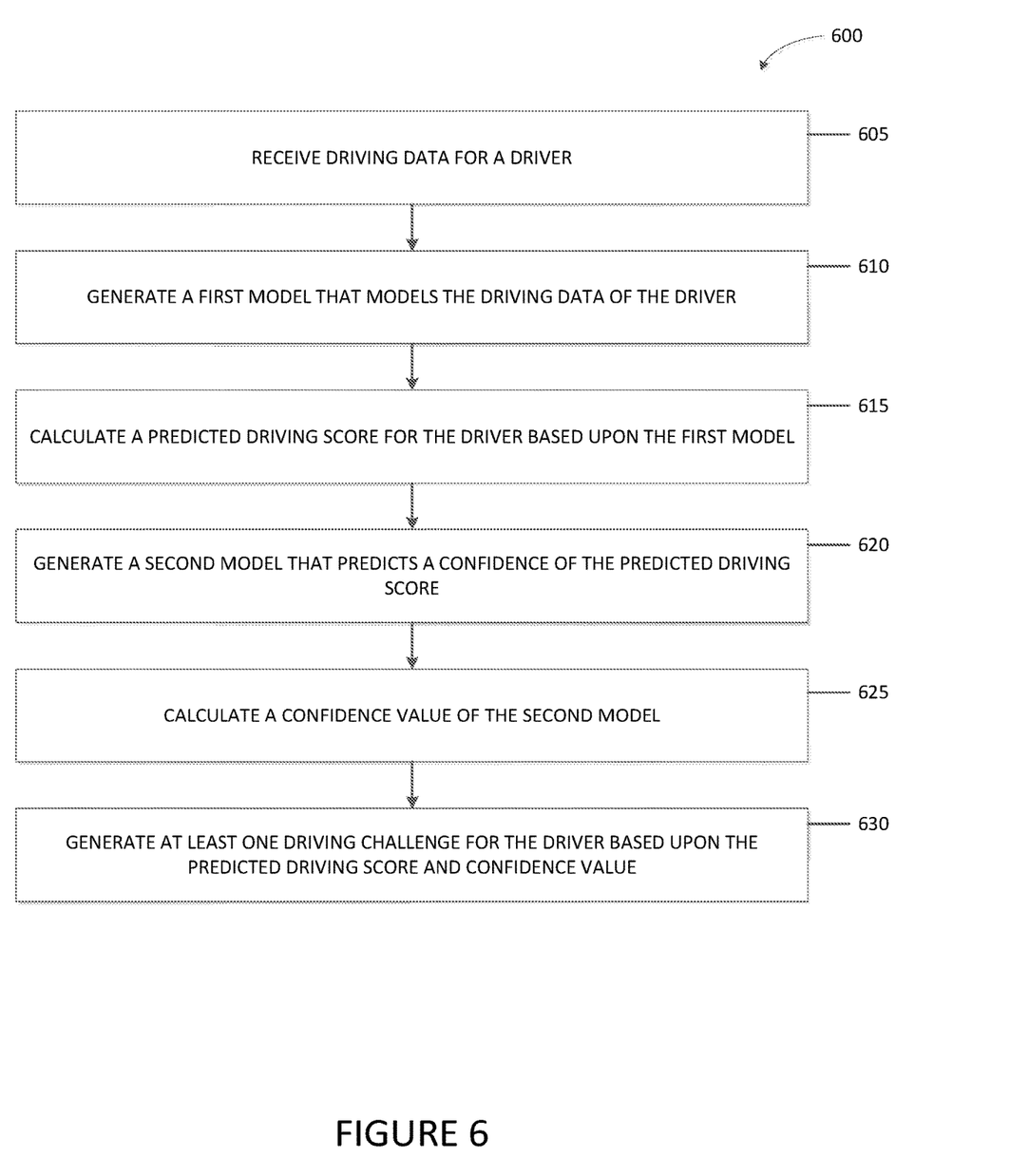
FIG. 6 illustrates a simplified block diagram of an exemplary process that may be carried out by the computer system shown in FIG. 2.

Processor 405 may execute computer-executable instructions for implementing aspects of the disclosure. In some embodiments, the processor 405 may be transformed into a special purpose microprocessor by executing computer-executable instructions or by otherwise being programmed. For example, the processor 405 may be programmed with the instructions such as illustrated in FIG. 6.

Exemplary Computer Devices

Figure 5:
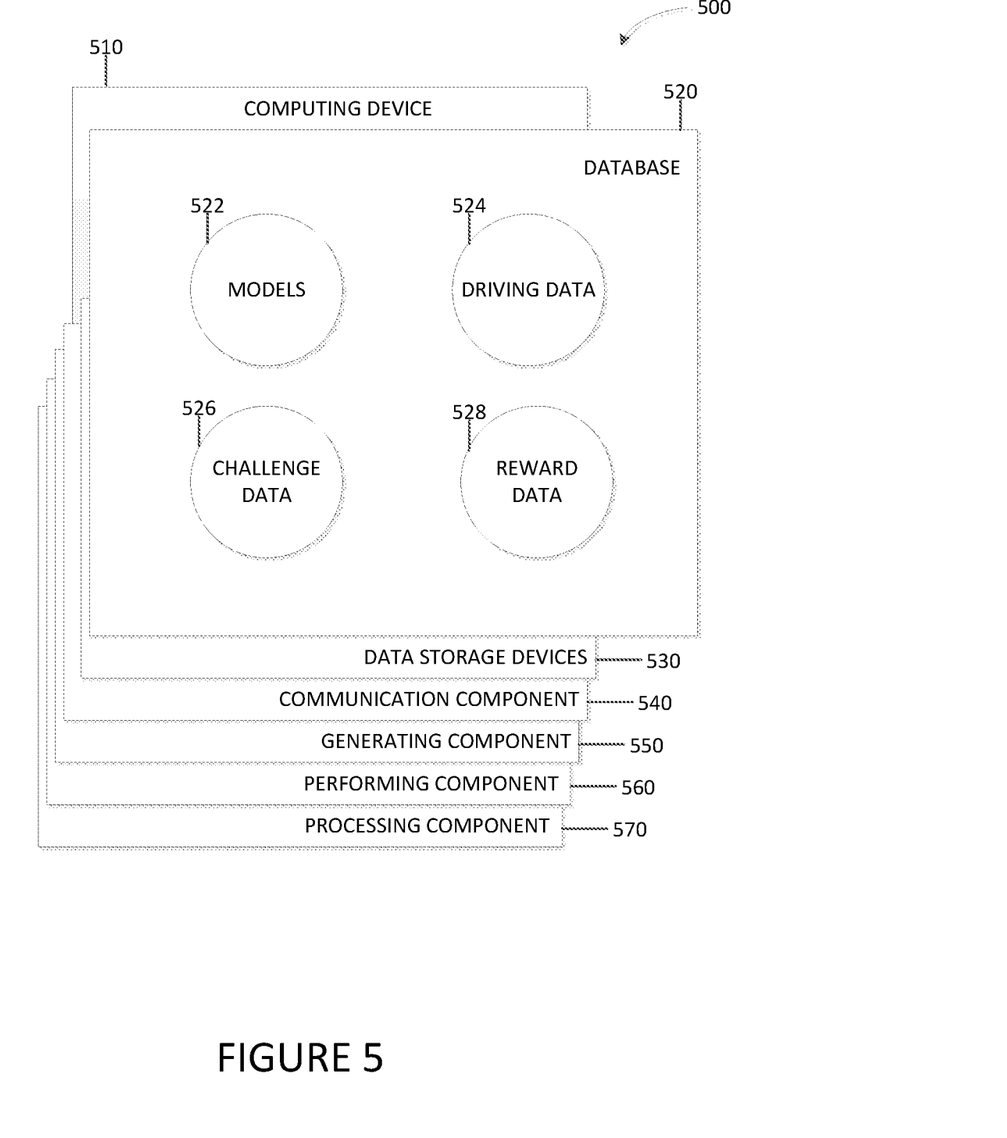
FIG. 5 illustrates a diagram of components of one or more exemplary computing devices that may be used in the computer system shown in FIG. 2.

FIG. 5 depicts a diagram 500 of components of one or more exemplary computing devices 510 that may be used to implement process 100 shown in FIG. 1 and may be used in system 200 shown in FIG. 2. In some embodiments, computing device 510 may be similar to driving challenge server 210 (shown in FIG. 2). Database 520 may be coupled with several separate components within computing device 510, which perform specific tasks. In this embodiment, database 520 may include models 522 (which may be similar to first model 104 and second model 106, both shown in FIG. 1), driving data 524, challenge data 526, and reward data 528. In some embodiments, database 520 is similar to database 220 (shown in FIG. 2).

Computing device 510 may include database 520, as well as data storage devices 530. Computing device 510 may also include a communication component 540. Computing device 510 may further include a generating component 550 for generating first model 104 and second model 106 (shown in FIG. 1). Moreover, computing device 510 may include a performing component 560 for predicting at least one probability that the driver will achieve a driving score. Further, a processing component 570 may assist with execution of computer-executable instructions associated with the system.

Exemplary Computer-Implemented Methods for Managing Driving Challenges

FIG. 6 illustrates a flow chart of an exemplary computer implemented process 600 for creating driving challenges using process 100 shown in FIG. 1. Process 600 may be implemented by a computing device, for example driving challenge server 210 (shown in FIG. 2). In the exemplary embodiment, driving challenge server 210 may be in communication with at least one user device 225 (shown in FIG. 2).

Process 600 may include receiving 605 driving data associated with a driver. Driving data may include user data, telematics data, and driving score data. Process 600 may include generating 610 a first model that models the received driving data of the driver and calculating 615 a predicted driving score for the driver based at least in part upon the generated 610 first model.

Process 600 may further include generating 620 a second model that predicts a confidence of the predicted driving score. A confidence value may be calculated 625 from the generated 620 second model, and the calculated 625 confidence value may be a squared error of the calculated 615 predicted driving score. At least one driving challenge may be generated 630 for the driver based at least in part upon the calculated 615 predicted driving score and the calculated 625 confidence value.

Exemplary Computer-Implemented Methods for Providing Driving Challenge Rewards

Figure 7:
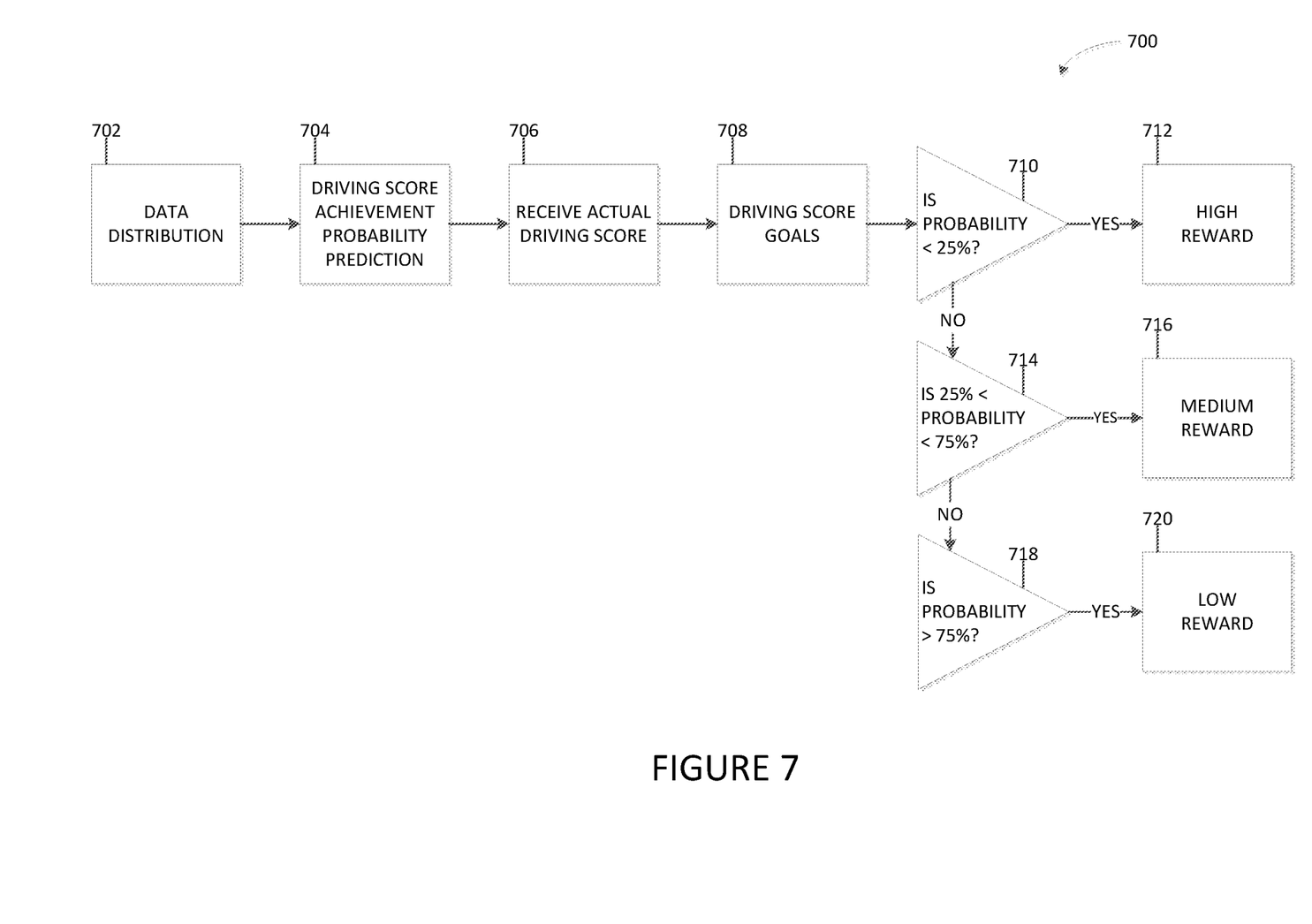
FIG. 7 illustrates a simplified diagram of a flow chart for providing a probability-based reward in accordance with one embodiment of the present disclosure.

FIG. 7 illustrates a flow chart of an exemplary computer implemented process 700 for providing driving challenge rewards using process 100 shown in FIG. 1. Process 700 may be implemented by a computing device, for example driving challenge server 210 (shown in FIG. 2). In the exemplary embodiment, driving challenge server 210 may be in communication with at least one user device 225 (shown in FIG. 2).

In the exemplary embodiment, driving challenge server 210 may generate a data distribution 702. Driving challenge server 210 may make a prediction 704 (e.g., a driving score achievement probability prediction 704), based at least in part upon data distribution 702. Prediction 704 may be a probability that the driver will achieve a predicted driving score (e.g., as calculated from first model 104 shown in FIG. 1). Driving challenge server 210 may receive an actual driving score 706 of the driver (e.g., over a set period of time). Driving challenge server 210 may compare actual driving score 706 to a plurality of driving score goals 708. Driving score goals 708 are determined as described herein and may be stored in a database associated with driving challenge server 210 (e.g., database 220 shown in FIG. 2). Driving challenge server 210 may provide a reward proportional to and/or representative of prediction 704 that the driver would achieve actual driving score 706. That is, driving challenge server may provide a reward to the driver that represents the difficulty of (e.g., inversely related to the probability) the driver achieving actual driving score 706. For example, (i) if a probability 710 of the driver achieving actual driving score 706 is less than 25%, a high reward 712 may be provided to the driver, (ii) if a probability 714 of the driver achieving actual driving score 706 is greater than 25% and less than 75%, a medium reward 716 may be provided to the driver, and (iii) if a probability 718 of the driver achieving actual driving score 706 is greater than 75%, a low reward 720 may be provided to the driver.

Exemplary Embodiments & Functionalities

In one aspect, a computer system for creating driving challenges may be provided. The computer system may include at least one processor in communication with at least one memory device. The at least one processor may be programmed to: (i) receive driving data associated with a driver, (ii) generate a first model that models the driving data associated with the driver, (iii) calculate a predicted driving score for the driver based at least in part upon the first model, (iv) generate a second model that predicts a confidence of the predicted driving score, (v) calculate a confidence value of the predicted driving score, wherein the confidence value is a squared error of the predicted driving score, and (vi) generate at least one driving challenge for the driver based at least in part upon the predicted driving score and the confidence value for that predicted driving score. The system may include additional, less, or alternate functionality, including that discussed elsewhere herein.

For example, additional functionality of the computer system may include the at least one processor further being programmed to: (i) calculate a mean value of the predicted driving score and a variance of the confidence value, (ii) generate a data distribution based at least in part upon the calculated mean and variance, wherein the data distribution is used to determine a probability that the driver will achieve the predicted driving score, (iii) generate one or more driving score goals associated with the driver based at least in part upon the probability that the driver will achieve each driving score goal of the one or more driving score goals, wherein the one or more driving score goals include at least an easy driving score goal that corresponds to a high probability that the driver will achieve the easy driving score goal, a medium driving score goal that corresponds to a moderate probability that the driver will achieve the medium driving score goal, and a low driving score goal that corresponds to a low probability that the driver will achieve the low driving score goal, (iv) generate an actual driving score associated with the driver, (v) determine whether the actual driving score meets one driving score goal of the one or more driving score goals, and (vi) provide a reward to the driver based at least in part upon the driving score goal that the driver met, wherein the reward is proportional to the probability that the driver would achieve the driving score goal, and wherein a higher reward is provided based at least in part upon a lower probability that the driver would achieve the driving score goal. Further, the driver may be insured by an insurance policy with an insurance premium, and the reward may be at least one of a discount of the insurance premium and a credit toward the insurance premium.

Further, additional functionality of the computer system may include the at least one processor further being programmed to: (i) store the driving data and the first model, (ii) generate the second model based at least in part upon the first model, and (iii) utilize one or more machine learning techniques to generate the first model and second model.

Further, the driving data may be comprised of telematics data including braking data, acceleration data, speed data, and demographic data that includes age and location, and the predicted driving score may be based at least in part upon at least one of the braking, acceleration, and speed data.

In another aspect, a computer-based method for creating driving challenges for drivers may be provided. The method may be implemented on a computer device that includes at least one processor in communication with at least one memory device, and the method may include: (i) receiving driving data associated with a driver, (ii) generating a first model that models the driving data associated with the driver, (iii) calculating a predicted driving score for the driver based at least in part upon the first model, (iv) generating a second model that predicts a confidence of the predicted driving score, (v) calculating a confidence value of the predicted driving score, wherein the confidence value is a squared error of the predicted driving score, and (vi) generating at least one driving challenge for the driver based at least in part upon the predicted driving score and the confidence value for that predicted driving score. The method may include additional, less, or alternate functionality, including that discussed elsewhere herein.

In yet another aspect, at least one non-transitory computer-readable storage media having computer-executable instructions embodied thereon may be provided. When executed by at least one processor in communication with at least one memory device, the computer-executable instructions may cause the processor to: (i) receive driving data associated with a driver, (ii) generate a first model that models the driving data associated with the driver, (iii) calculate a predicted driving score for the driver based at least in part upon the first model, (iv) generate a second model that predicts a confidence of the predicted driving score, (v) calculate a confidence value of the predicted driving score, wherein the confidence value is a squared error of the predicted driving score, and (vi) generate at least one driving challenge for the driver based at least in part upon the predicted driving score and the confidence value for that predicted driving score. The computer-executable instructions may include additional, less, or alternate functionality, including that discussed elsewhere herein.

Examples of Machine Learning & Other Matters

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs.

Additionally or alternatively, the machine learning programs may be trained by inputting sample data sets or certain data into the programs, such as image data, text data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs. In one embodiment, one or more machine learning techniques may be used to extract data about the computer device, the user of the computer device, driver and/or vehicle, documents to be provided, the model being simulated, home owner and/or home, buyer, geolocation information, image data, home sensor data, and/or other data.

Based at least in part upon these analyses, the processing element may learn how to identify characteristics and patterns that may then be applied to training models and analyzing sensor data, driving data, driving score data, and/or other data.

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without needing a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

I claim:

1. A computer system for creating driving challenges for drivers, the computer system including at least one processor in communication with at least one memory device, wherein the at least one processor is programmed to:
    receive driving data associated with a driver;
    generate a first model that models the driving data associated with the driver;
    calculate a predicted driving score for the driver based at least in part upon the first model;
    generate a second model that predicts a confidence of the predicted driving score;
    calculate a confidence value of the predicted driving score based at least in part upon the second model;
    generate at least one driving challenge for the driver based at least in part upon the predicted driving score and the confidence value for the predicted driving score;
    calculate a mean value of the predicted driving score and a variance of the confidence value;
    generate a data distribution based at least in part upon the calculated mean value and the calculated variance; and
    determine a probability that the driver will achieve the predicted driving score based at least in part upon the data distribution.

2. The computer system of claim 1, wherein the processor is further programmed to:
    generate one or more driving score goals associated with the driver based at least in part upon the probability that the driver will achieve each driving score goal of the one or more driving score goals, wherein the one or more driving score goals includes at least an easy driving score goal that corresponds to a high probability that the driver will achieve the easy driving score goal, a medium driving score goal that corresponds to a moderate probability that the driver will achieve the medium driving score goal, and a low driving score goal that corresponds to a low probability that the driver will achieve the low driving score goal.

3. The computer system of claim 2, wherein the processor is further programmed to:
    generate an actual driving score associated with the driver;
    determine whether the actual driving score meets one driving score goal of the one or more driving score goals; and
    provide a reward to the driver based at least in part upon the driving score goal that the driver met, wherein the reward is proportional to the probability that the driver would achieve the driving score goal, and wherein a higher reward is provided based at least in part upon a lower probability that the driver would achieve the driving score goal.

4. The computer system of claim 3, wherein the driver is insured by an insurance policy with an insurance premium, and wherein the reward includes one of a discount of the insurance premium and a credit toward the insurance premium.

5. The computer system of claim 1, wherein the at least one processor is further programmed to:
    store the driving data and the first model; and
    generate the second model based at least in part upon the first model.

6. The computer system of claim 1, wherein the at least one processor is further programmed to:
    utilize one or more machine learning techniques to generate the first model and second model.

7. The computer system of claim 1, wherein the driving data is comprised of telematics data including braking data, acceleration data, speed data, and demographic data that includes age and location, and wherein the predicted driving score is based at least in part upon at least one of the braking, acceleration, and speed data.

8. A computer-based method for creating driving challenges for drivers, the method implemented on a computer device including at least one processor in communication with at least one memory device, said method comprising:
receiving driving data associated with a driver;
generating a first model that models the driving data associated with the driver;
calculating a predicted driving score for the driver based at least in part upon the first model;
generating a second model that predicts a confidence of the predicted driving score;
calculating a confidence value of the predicted driving score based at least in part upon the second model;
generating at least one driving challenge for the driver based at least in part upon the predicted driving score and the confidence value for the predicted driving score;
calculating a mean value of the predicted driving score and a variance of the confidence value;
generating a data distribution based at least in part upon the calculated mean value and the calculated variance; and
determining a probability that the driver will achieve the predicted driving score based at least in part upon the data distribution.

9. The method of claim 8 further comprising:
generating one or more driving score goals associated with the driver based at least in part upon the probability that the driver will achieve each driving score goal of the one or more driving score goals, wherein the one or more driving score goals includes at least an easy driving score goal that corresponds to a high probability that the driver will achieve the easy driving score goal, a medium driving score goal that corresponds to a moderate probability that the driver will achieve the medium driving score goal, and a low driving score goal that corresponds to a low probability that the driver will achieve the low driving score goal.

10. The method of claim 9 further comprising:
generating an actual driving score associated with the driver;
determining whether the actual driving score meets one driving score goal of the one or more driving score goals; and
providing a reward to the driver based at least in part upon the driving score goal that the driver met, wherein the reward is proportional to the probability that the driver would achieve the driving score goal, and wherein a higher reward is provided based at least in part upon a lower probability that the driver would achieve the driving score goal.

11. The method of claim 10, wherein the driver is insured by an insurance policy with an insurance premium, and wherein the reward includes one of a discount of the insurance premium and a credit toward the insurance premium.

12. The method of claim 8 further comprising:
storing the driving data and the first model; and
generating the second model based at least in part upon the first model.

13. The method of claim 8 further comprising:
utilizing one or more machine learning techniques to generate the first model and second model.

14. At least one non-transitory computer-readable storage media having computer-executable instructions embodied thereon, wherein when executed by at least one processor in communication with at least one memory device, the computer-executable instructions cause the processor to:
receive driving data associated with a driver;
generate a first model that models the driving data associated with the driver;
calculate a predicted driving score for the driver based at least in part upon the first model;
generate a second model that predicts a confidence of the predicted driving score;
calculate a confidence value of the predicted driving score based at least in part upon the second model;
generate at least one driving challenge for the driver based at least in part upon the predicted driving score and the confidence value for the predicted driving score;
calculate a mean value of the predicted driving score and a variance of the confidence value;
generate a data distribution based at least in part upon the calculated mean value and the calculated variance; and
determine a probability that the driver will achieve the predicted driving score based at least in part upon the data distribution.

15. The storage media of claim 14, wherein the computer-executable instructions further cause the processor to:
generate one or more driving score goals associated with the driver based at least in part upon the probability that the driver will achieve each driving score goal of the one or more driving score goals, wherein the one or more driving score goals includes at least an easy driving score goal that corresponds to a high probability that the driver will achieve the easy driving score goal, a medium driving score goal that corresponds to a moderate probability that the driver will achieve the medium driving score goal, and a low driving score goal that corresponds to a low probability that the driver will achieve the low driving score goal.

16. The storage media of claim 14, wherein the computer-executable instructions further cause the processor to:
generate an actual driving score associated with the driver;
determine whether the actual driving score meets one driving score goal of the one or more driving score goals; and
provide a reward to the driver based at least in part upon the driving score goal that the driver met, wherein the reward is proportional to the probability that the driver would achieve the driving score goal, and wherein a higher reward is provided based at least in part upon a lower probability that the driver would achieve the driving score goal.

17. The storage media of claim 16, wherein the driver is insured by an insurance policy with an insurance premium, and wherein the reward includes one of a discount of the insurance premium and a credit toward the insurance premium.

* * * * *